(No Model.)
T. A. WARD, J. R. TURNER & J. W. KENDALL.
ADVERTISEMENT WAGON.
No. 569,982. Patented Oct. 20, 1896.
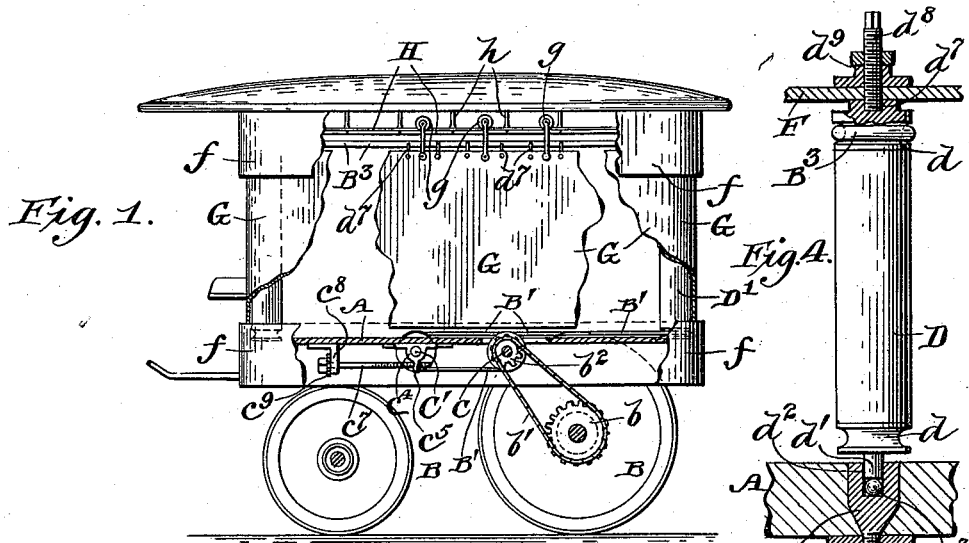
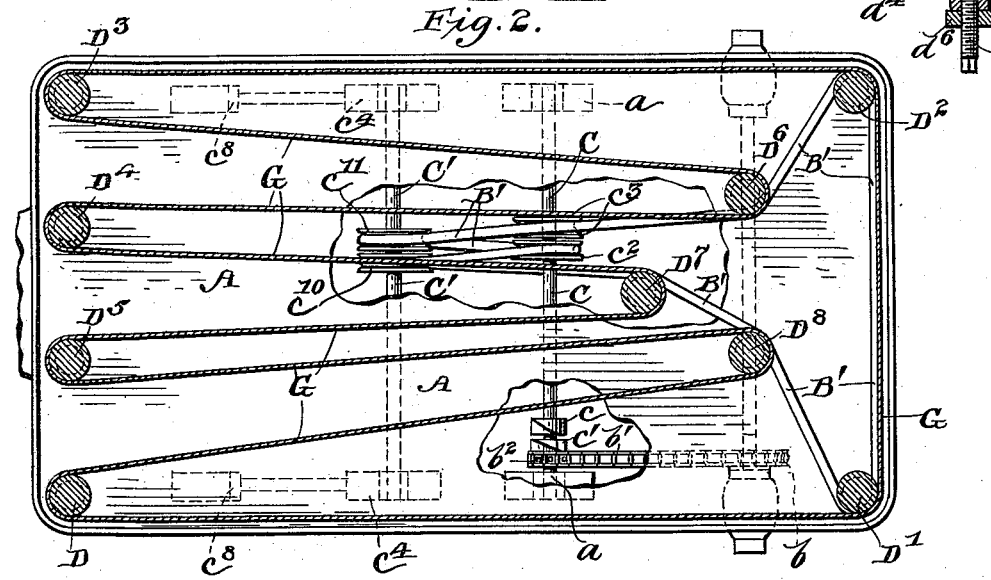
WITNESSES
INVENTORS

United States Patent Office.

THEODORE A. WARD, JOSEPH R. TURNER, AND JOSEPH W. KENDALL, OF TACOMA, WASHINGTON.

ADVERTISEMENT-WAGON.

SPECIFICATION forming part of Letters Patent No. 569,982, dated October 20, 1896.

Application filed February 5, 1896. Serial No. 578,162. (No model.)

*To all whom it may concern:*

Be it known that we, THEODORE A. WARD, JOSEPH R. TURNER, and JOSEPH W. KENDALL, citizens of the United States, residing at Tacoma, in the county of Pierce and State of Washington, have invented certain new and useful Improvements in Advertising-Wagons; and we do hereby declare the following to be a full, clear, and exact description of the invention, such as will enable others skilled in the art to which it appertains to make and use the same.

Our invention relates to improvements in advertising-wagons of that type which employ continuously-revolving flexible advertisement carrying or display aprons; and it consists in the combination, with a wagon truck and frame, of a revoluble advertising or display apron which forms the inclosing or vertical upper portion of the sides of the wagon, revoluble standards mounted upon the wagon-body, belts and pulleys or wheels for positively revolving a portion of the standards and the apron, means for connecting a portion of said standards with one of the traction-wheels of the wagon, and which by the movement of the wagon over the roadway will cause said standards and the flexible advertising-apron to revolve continuously, all as will be hereinafter described and specifically claimed.

It also consists of certain other novel constructions, combinations, and arrangements of parts, all of which will be hereinafter more particularly set forth and claimed.

In the accompanying drawings, forming part of this specification, Figure 1 represents a side elevation of the devices embodying our invention, the advertising-canvas being broken away to expose the interior of the wagon. Fig. 2 represents a central horizontal section through said devices. Fig. 3 represents a central vertical detail section through the adjusting devices for tightening the power-belt; and Fig. 4 represents a detail side elevation, partly in section, of one of the supporting-standards.

A in the drawings represents the floor of the wagon, and B the running-gear.

The wagon is provided with the usual springs, driver's seat, and the like, as illustrated in the drawings.

The hub of one of the rear wheels is provided with a sprocket-wheel $b$. This wheel is connected by a sprocket-chain $b'$ with a sprocket-wheel $b^2$, loosely mounted upon a transverse shaft C. The said shaft C is suitably journaled in antifriction bearing-boxes $a$, secured to the floor A, and is provided with one member, $c$, of a clutch, the other member, $c'$, of the clutch being formed on the wheel $b^2$. These clutch members engage on the forward movement of the wagon to revolve the shaft C, but immediately disengage upon any backward movement of the wheel carrying the sprocket $b^2$, such as occurs in turning the wagon short around. Belt-wheels $c^2$ $c^3$ are rigidly mounted upon said shaft C to accommodate the power-belt B', as will be hereinafter more fully described.

A shaft C', similar to shaft C, is journaled in antifriction bearing-boxes $c^4$. These boxes are adapted to slide upon the floor A and are each provided with a lug $c^5$, having a screw-threaded aperture $c^6$. Each of these lugs is engaged by a screw-bolt $c^7$, the opposite ends of said bolts passing, respectively, through brackets $c^8$, mounted on the floor and being provided with milled heads $c^9$, by which they may be rotated to adjust the bearings. The shaft C' is provided with belt-wheels $c^{10}$ $c^{11}$, over which the power-belt passes.

Revoluble supporting-standards D D' D² D³ are mounted at each corner of the floor or platform A. Each of these standards is provided at the top and bottom with a belt-wheel $d$. The lower end of each standard is provided with a short stem $d'$, which fits into a socket $d^2$ and rests upon a ball $d^3$ therein. The socket $d^2$ is formed in a bearing-block $d^4$, which is provided with a screw-threaded shank $d^5$. This shank is squared at its end and passes through a nut $d^6$, attached to the floor A, whereby the bearing can be adjusted vertically. The top of each standard is provided with a socket $d^7$, which is adapted to receive the end of a screw-threaded shank $d^8$, that is mounted in a nut $d^9$, secured in the top frame F of the wagon. (See Fig. 4.) The upper end of this shank is squared, so that it may be turned by a suitable wrench to tighten the bearing.

It will be observed from the aforegoing that the standards are supported upon antifriction-bearings, which may be adjusted or tightened to compensate for any wear. Auxiliary standards $D^4$, $D^5$, $D^6$, $D^7$, and $D^8$, similar to the corner-standards, are journaled in the same manner as said latter standards at suitable points in the wagon, whereby the extra length of an endless canvas G, which passes about the corner-standards, is accommodated. An endless leather, rubber, or other flexible belt $B^3$ passes about the belt-wheels at the top of all the standards, whereby they are revolved at the same speed and at the same time.

The endless power-belt $B'$ passes first about the belt-wheel at the bottom of the standard $D'$, then over that at the bottom of the standard $D^8$, next over the wheel of standard $D^7$, then about the belt-wheel $c^{10}$, next about belt-wheel $c^2$, then back again about belt-wheel $c^{11}$, next forward over belt-wheel $c^3$, then over the lower belt-wheel of standard $D^6$, and, lastly, about the lower belt-wheel of standard $D^2$. The object in passing the belt around two wheels on the power-shaft is to prevent it from slipping by providing more frictional contact. It will now be clear why the shaft $C'$ is journaled in movable bearing-boxes, for we thereby secure an adjustment whereby any stretch or slack in the power-belt may be taken up.

A suitable endless track H is suspended by hangers $h$ from the top of the wagon and follows the contour of the upper edge of the endless canvas.

Suitable flanged traction-wheels $g$ are attached at intervals to the upper edge of the endless canvas and are supported by and run upon the endless track H. By means of this method of supporting the endless canvas at its upper edge it is not necessary to stretch the canvas tightly about the standards and thus cause additional friction. The canvas simply engages the standards with sufficient friction to cause it to be revolved thereby. The endless canvas is preferably constructed in sections secured together by hooks, so that one section may be removed for painting and pasting bills upon the same without disturbing the remaining sections. The canvas is also secured at its upper edge to the endless belt $B^3$ by hooks $d^7$.

Instead of causing the extra length of canvas to fill the entire wagon the standards can be so arranged that an open space for parcels and the like will be left in the center of the wagon. The upper and lower edges of the canvas are hidden by upper and lower side and end boards $ff$, that pass completely about the wagon. The open front end of the wagon is closed by a panel $f'$. The roof and sides of the wagon are preferably formed of slats, over which canvas is stretched. This canvas is made waterproof by painting or in any other suitable manner. The roof is supported in position and the entire framework of the wagon braced by suitable rods.

It will be seen from the aforegoing that as the wagon moves forward the endless power-belt also moves and thereby rotates the standards, which in turn move the endless canvas and bring the advertisements painted thereon successively into view.

The great advantage accomplished by this advertising-wagon is the total absence of any friction that would prevent the forward movement of the wagon to any appreciable degree.

Having now described our invention, what we claim as new, and desire to secure by Letters Patent, is—

1. In an advertising-wagon, the combination with a wagon proper having a continuously-revolving advertising-apron which forms the sides of the upper portion of the wagon, of revoluble standards mounted upon the wagon-body in such manner as to permit the continuously-revolving advertising-apron to be passed about them and to double on itself in a zigzag line in the manner described and shown, and thus permit a very great length of apron to be used on a small wagon, and means for revolving said standards and said apron, said means being connected with one of the traction-wheels of the wagon, substantially as described.

2. In an advertising-wagon, the combination with a wagon proper having a continuously-revolving advertising-apron which forms the inclosing sides of the upper portion of the wagon, of revoluble standards mounted upon the wagon body or frame as described and shown, and provided with belt pulleys or wheels at bottom and top, and having the advertising-apron passed about them, a horizontal lower belt-wheel shaft mounted on said wagon and carrying a pair of belt pulleys or wheels, gearing for connecting the power mechanism of the wagon with said shaft, and a lower endless operating-belt, connecting the belt-wheels on said shaft with the belt-wheels on the standard, and thereby operating the latter and moving the endless apron, substantially as described.

3. In an advertising-wagon, the combination with a wagon proper, of revoluble standards mounted upon the same, an endless advertising-apron passed about said standards and forming the sides of the upper portion of the wagon and provided along its upper edge with supporting-wheels, a track mounted upon the frame of said wagon above the upper edge of said apron, and adapted to receive said supporting-wheels, and means for revolving said apron, substantially as described.

4. In an advertising-wagon, the combination with a wagon proper, revoluble standards mounted upon the same, two shafts mounted in said wagon and each carrying a pair of belt-wheels, means for adjusting one shaft away from the other, clutch mechanism on one of the shafts, an endless belt passed about said wheels, and a portion of the revoluble standards, means connecting one of said shafts to the power mechanism of the wagon, a continuously-revolving endless advertising-apron forming the inclosing portion of the upper part of the wagon, and passed about said standards, and means for supporting the upper edge of the apron, substantially as described.

In testimony whereof we hereunto affix our signatures in presence of two witnesses.

THEODORE A. WARD.
    JOSEPH R. TURNER.
    JOSEPH W. KENDALL.

Witnesses:
 FRANK J. MILLER,
 G. W. DELAMATER.